July 19, 1966   A. A. BALLMAN ETAL   3,262,058
NONLINEAR DEVICES UTILIZING LiNbO₃
Filed Nov. 27, 1964   2 Sheets-Sheet 1

INVENTORS
A. A. BALLMAN
G. D. BOYD
R. C. MILLER
BY George S. Indig
ATTORNEY

United States Patent Office 3,262,058
Patented July 19, 1966

3,262,058
NONLINEAR DEVICES UTILIZING LiNbO₃
Albert A. Ballman, Woodbridge, Gary D. Boyd, Murray Hill, and Robert C. Miller, Summit, N.J., assignors to Bell Telephone Laboratories, Incorporated, New York, N.Y., a corporation of New York
Filed Nov. 27, 1964, Ser. No. 414,366
18 Claims. (Cl. 330—4.5)

This invention relates to nonlinear devices generally containing bodies of lithium meta niobate, LiNbO₃. LiNbO₃ devices of this invention are operative over the electromagnetic wavelength range of from 0.4 to 5 microns, within which they may function as generators or amplifiers. Included functions of particular interest are second harmonic generation (SHG), and parametric oscillation, amplification, mixing, etc.

Probably the most exciting development in the scientific world within the past few years has been the postulation and, finally, the fruition of the maser or laser. The scientist now has available for the first time a coherent source of electromagnetic radiation extending through the visible spectrum. From the technological standpoint, the real impact is far from being realized.

While intense activity continues to be directed to the development and improvement of new masers and lasers, parallel developments utilizing these new coherent sources and extending their frequency range have also received considerable attention. One class of devices utilizes the nonlinear characteristics of materials transparent to the energy of concern to generate or amplify coherent radiation of a frequency or frequencies differing from that of the energizing source. Illustrative publications include volume 35, Review of Modern Physics, page 23 (1963), reporting second harmonic generation and volume 127, Physical Review, page 1918 (1962), directed to parametric effects.

The nonlinearity upon which this general class of devices is dependent is prominent in that class of materials which are piezoelectric. Effective use of such materials is dependent upon the continued interaction of energizing radiation or pump with the resulting radiation, whether it be of a higher frequency, as in SHG, or a lower frequency, as in certain of the parametric devices. It is in this very area that the reason for the general ineffectiveness of many of the prior art devices is found. Materials in the included class are dispersive, that is, their index of refraction, $n$, and, consequently, electromagnetic wave velocity, is frequency dependent, with the result that interaction can be obtained only over that limited distance within the crystal within which the waves are approximately matched. It was recognized by J. A. Giordmaine in Physical Review Letters, volume 8, page 19, that the general ineffectiveness of these devices was not to be overcome simply by finding stronger nonlinearity, and that a more fruitful improvement would flow from the phase-matching of the waves. This he achieved by use of a nonlinear medium evidencing a degree of birefringence adequate to compensate for the dispersion of the medium. His approach was to utilize a crystalline direction such that the velocity of the ordinary ray of one frequency was the same as that of the extraordinary ray of another. A simple extension of this indicated those conditions which could be met within such a material which would, in effect, permit the continued interaction of the three frequencies of concern in nondegenerate parametric devices.

Subsequent work has followed the direction of Giordmaine. The application of these principles to parametric devices is described, for example, in U.S. application Serial Numbers 158,267, filed December 11, 1961, 224,294, filed September 18, 1962, and Patent No. 3,201,709, issued August 17, 1965.

Much of the described work on Giordmaine-type devices has been directed to the use of an organic piezoelectric material, potassium dihydrogen phosphate, KDP, which, while having a nonlinear coefficient which is significantly inferior to that of many other known piezoelectrics, is possessed of sufficient birefringence to meet the phase-matching requirements. As important from the experimental standpoint, the material is easily grown and is, in consequence, available in the requisite size and perfection for use at frequencies in the visible and near-visible spectrum.

An important aspect of this invention derives from the discovery that a particular inorganic material, LiNbO₃, which is water-insoluble and generally of known physical and chemical stability, like KDP manifests negative birefringence sufficient to permit its use in the concerned class of devices essentially over its entire transparency wave band, 0.4 to 5 microns. While the discovery of these properties, permitting phase-matching in this inorganic material, which can also be grown by conventional seeding techniques, is, itself, of significance, particularly from the technological standpoint, it is perhaps of greater significance at this stage of development that this lithium niobate, as a nonlinear material, has a nonlinear coefficient showing more than an order of magnitude improvement over KDP.

In accordance with this invention, therefore, there are described nonlinear electromagnetic generating and amplifying devices utilizing LiNbO₃ as the functional element. Certain of the properties of this material suggest particularly advantageous device designs which, in turn, constitute preferred embodiments. One such device in particular deserves comment. This is the frequency variable parametric oscillator or amplifier generally operated in the nondegenerate mode, with frequency variation being accomplished by adjusting the effective birefringence-dispersion relationship. Two techniques are considered particularly significant. One is the rotation of the crystal so as to vary the angle between the electromagnetic energy input and the optic axis. The other is to vary the temperature, it having been observed that the birefringence-dispersion relationship is strongly temperature dependent. This last aspect of the invention is considered to be of general applicability to phase-matchable materials in general.

Description of the invention is expedited by reference to the drawing, in which:

FIG. 1, on coordinates of index of refraction $n$ and wavelength $\lambda$, in microns, is a plot showing the dispersion for the indices of the ordinary and extraordinary rays, $n^o$ and $n^e$, respectively;

FIG. 2, on coordinates of birefringence, $\Delta n_B = n^o - n^e$, on the ordinate and temperature in degrees C. on the abscissa, is a plot showing the temperature dependence of that parameter;

It has been indicated that in the main this invention derives from particularly advantageous properties in lithium meta niobate. These properties, taken in context with certain prior art teachings, notably that of Giordmaine, are considered an adequate characterization of many of the inventive embodiments. Much of Giordmaine's work involved the use of KDP. A comparison of the properties of LiNbO₃ with those of KDP indicates the ready substitution of the one material for the other. LiNbO$_3$ is a uniaxial piezoelectric crystal with point group symmetry 3m. Its uniaxial direction or optic axis, that is the sole direction through the crystal in which there is no manifestation of birefringence, coincides with the crystallographic $c$, sometimes designated $z$, axis. This is similar to the situation which obtains in KDP and indicates that for phase matching a beam direction other than along the optic axis is required. The birefringence in LiNbO$_3$, like that in KDP, is negative in sign. In accordance with the usual convention, this indicates that the index of refraction for the ordinary ray is greater than that for the extraordinary ray at a given frequency. Since the velocity of a wave through a dispersive medium of the type under consideration decreases with increasing frequency, and since velocity is inversely proportional to index of refraction, it follows that for the simple two-frequency case, such as SHG or degenerate parametric effect, the higher frequency extraordinary ray may be velocity or phase matched with the lower frequency ordinary ray. The relationship for the three-frequency case is similar and is discussed in detail further on.

The useful nonlinear coefficients in LiNbO$_3$ are $d_{22}$ and $d_{31}$ (these tensor elements being defined by Kleinman in volume 126, Physical Review, page 1977 (1962)), which have values which are, respectively, 6.3 and 11.9 times that of the most efficient coefficient $d_{36}$ for KDP. The absolute value for $d_{36}$ in KDP has been measured as $3 \times 10^{-9}$ esu. In the first approximation, for the simple case of SHG, the harmonic power is proportional to $d^2 l^2$, where for phase-matched materials $l$ is the crystal length. The relative values of nonlinear coefficient for LiNbO$_3$ and KDP indicate an efficiency of the order of 120 times greater than that for the prior art material.

Figure 1:
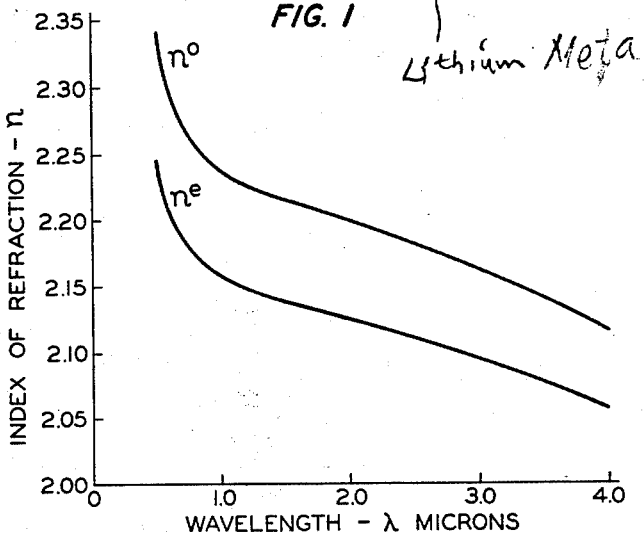

An indication of the approximate dispersion and birefringence for LiNbO$_3$ may be obtained from FIG. 1. The birefringence, which is defined as $\Delta n_B = n^o - n^e$, where $n^o$ and $n^e$ are the indices of refraction for a given frequency of the ordinary and extraordinary ray, respectively, is simply the distance between curves 1 and 2 taken at any desired wavelength $\lambda$. So, for example, the birefringence for a wavelength of two microns is 2.198 minus 2.124, or 0.074. Since the curves $n^o$ and $n^e$ are substantially equidistant for $\lambda$ values of from about 0.8 to about 4.0 microns, this value of birefringence may be considered as characterizing the material over most of its visible transparent bandwidth.

Dispersion is generally defined as the difference in index of refraction between two frequencies of concern. In general terms, this is a meaningful value as applied to either the ordinary or the extraordinary ray. For the simple SHG case, arbitrarily considering only the ordinary ray and for a fundamental frequency corresponding with a $\lambda$ of two microns (so resulting in a second harmonic wavelength $\lambda$ of one micron), it is seen that the dispersion $\Delta n_D$ is equal to 2.238 minus 2.198, or 0.040. For phase matching, it is required that the condition $n_2^e \leq n_1^o$. This condition is clearly met in this instance, since $n_2^e$ (for the one micron wave) = 2.157, which is smaller than $n_1^o$, which for the two-micron wave is equal to 2.198.

For the SHG case under consideration, the crystalline material has more than adequate birefringence to compensate for dispersion. It remains to reduce this birefringence, or increase the dispersion, or vary both so as to make the values equal. The specific technique suggested by Giordmaine calls for rotation of a crystal. The birefringence values, which may be measured from the data plotted on FIG. 1, are maximum values, that is, they are a measure of the birefringence of a beam which is normal to the optic axis. The birefringence along the optic axis is, by definition, zero. The mechanism for phase matching proposed by Giordmaine takes advantage of the fact that angular beam directions relative to the Z axis intermediate 90 degrees and zero degree have associated birefringence values intermediate the maximum and zero. The matching angle $\theta_m$ is given by the expression $$\sin^2 \theta_m = \left(\frac{n_2^e}{n_1^o}\right)^2 \frac{[(n_2^o)^2 - (n_1^o)^2]}{[(n_2^o)^2 - (n_2^e)^2]} \approx \frac{D}{B}$$

As in the convention followed above, $n$ is the index of refraction, subscripts 1 and 2 relate to fundamental and harmonic, respectively, or for the general degenerate case, the lower and higher frequencies, respectively. Superscripts $o$ and $e$ refer to ordinary and extraordinary, respectively. D is a dispersive term defined as $n_2^o$ minus $n_1^o$, and B is the birefringence, here defined as $n_2^o$ minus $n_2^e$.

Figure 2:
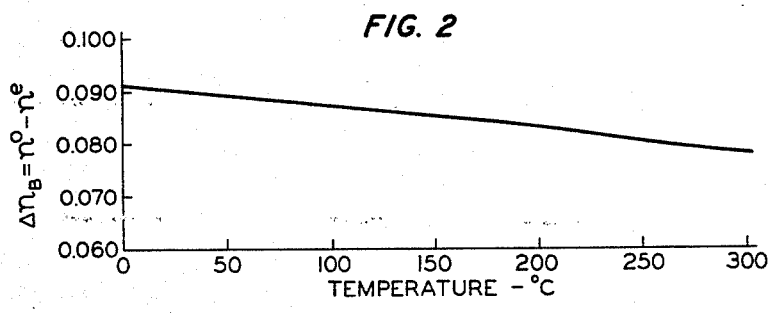
Figure 3:
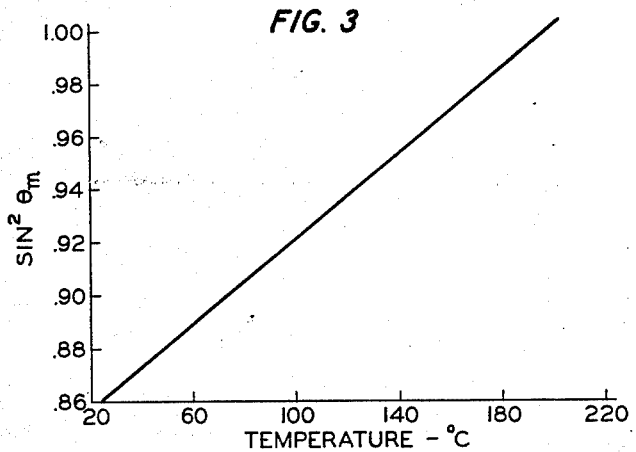
FIG. 3 is an illustrative plot in units of matching angle, $\sin^2 \theta_m$, with $\theta_m$ degrees on the ordinate and temperature in degrees C. on the abscissa, showing the temperature dependence of the phase matching angle.

FIGS. 2 and 3 contain illustrative curves showing another property of the material herein which may be usefully applied to making the two quantities $n_2^e$ and $n_1^o$ equal. The first of these figures shows the variation in birefringence $n^o$ minus $n^e$ with temperature for a wavelength of 0.5893 micron. This temperature dependence of birefringence, of the order of three times as great as the temperature dependence of the dispersion, may serve as a first approximation in the determination of the temperature at which the crystal may be maintained to bring about the phase-matching condition.

FIG. 3 shows the temperature dependence of the phase match angle $\theta_m$ for a 1.15 micron wavelength fundamental. Similar measurements made using a 1.06 coherent light source show the suitability of $\theta_m = 90$ degrees at a temperature of about 0° C.

It is evident that this alternate technique for bringing about the phase-matching conditions, i.e. by adjustment of temperature, may permit matching for a broad range of values of $\theta_m$. This independent means for varying the relative values of the indices may be of particular technological significance. While the general phase-matching approach overcomes the main restriction in devices of the type under consideration, in significantly increasing the coherence length, there is an additional effect which may reduce this distance to a value less than that of the total crystal dimension in the direction of propagation. This effect, due to double refraction, and often computed in terms of the Poynting vector, obtains whenever the angle of incidence relative to the optic axis is other than 90 degrees (of course restricting ourselves to a value of $\theta_{m_B} \neq$ to 0). This consideration may be significant, as illustrated by the example in which the indicated phase match angle $\theta_m$ equals 45 degrees for the SHG case utilizing a two-micron source for which the double refraction effect sets a limit on the coherence length. This restriction may be removed entirely simply by maintaining the crystal at a temperature such that the total maximum birefringence, B, equals the dispersion, D, so as to permit a value of $\theta_m$ equal to 90 degrees. For a 1.06 source utilized in an SHG device, it has been indicated that this condition obtains for a temperature of about 0° C. For the data plotted in FIG. 5 utilizing a 1.15 micron source, $\theta_m$, was made equal to 90 degrees at about 198° C. Similar variation in the requisite value of $\theta_m$ with temperature is obtainable in other phase-matchable materials, and it is here recognized as a general property. The temperature dependence of $\theta_m$, of course, varies with composition. Recent studies have indicated that relatively small compositional changes in a specific prototype material may result in a noticeable change in the specific $\theta_m$ value required. Temperature variation of the nonlinear medium in devices encompassed within this disclosure is considered to define an embodiment of the invention without limitation to a specific material. Of course, the application of this principle to LiNbO$_3$ constitutes a preferred embodiment. The use of temperature variation for varying the generated frequency, usually for a nondegenerate parametric device, is described in a subsequent portion of this disclosure.

For simplicity, much of the description thus far has been in terms of SHG. These simplifying assumptions directly apply for a degenerate parametric oscillation or amplification, remembering that, for this negative birefringent material, phase matching is always between the higher frequency extraordinary ray, whether this be the harmonic for SHG or the pump for a degenerate parametric oscillation or amplification, on the one hand, and the lower frequency ordinary ray, on the other. It has been recognized that the limitation of the coherence distance due to a mismatch in phase velocity may be removed for a three-frequency case such as nondegenerate parametric oscillation, amplification, or mixing. See 29 Journal of Applied Physics, 1347 (1958). Phase-matched nondegenerate parametric devices utilizing this principle are described in copending applications as noted above. It is, of course, axiomatic that the advantages of $LiNbO_3$ serve in devices represented by those described in the copending applications.

The required condition for phase matching in the three-frequency case is $\omega_3 n_3 = \omega_1 n_1 + \omega_2 n_2$, in which $\omega$ equals frequency, for example in cycles per second, $n$, as before, is the associated refractive index in the appropriate wave, and the subscripts 1, 2, and 3 refer to the lower frequencies and the highest frequency, respectively. For a negative birefringent material $n_3$ is the relevant index of the extraordinary ray and $n_1$ and $n_2$ are generally both those of the ordinary ray so that $\omega_3 n_3° = \omega_1 n_1° + \omega_2 n_2°$. For parametric oscillation or amplification $\omega_1 + \omega_2 = \omega_3$ and the designation of the frequency corresponding with subscript 1 or 2 as signal or idler is arbitrary since either frequency may be regarded in either function. For the purpose of this discussion, subscript 1 is considered to have reference to the signal frequency for this mode. The highest frequency for parametric oscillation or amplification is, of course, the pump frequency, and subscript 3 has reference to it.

The utility of $Li\gamma bO_3$ in a three-frequency device and the applicability of the equation showing the necessary phase-matching conditions are clear. While the SHG case, and the obvious advantage of utilizing the material of this invention for such application, is significant, it is considered that the technological interest will center on a three-frequency device. This device, it is thought, will be a variable frequency coherent source. When made of $LiNbO_3$, its frequency range matches that of the wave band of its transparency, i.e. from 0.4 to 5 microns. Devices capable of serving this function are the subject of the copending applications supra. The operating principle of these devices depends upon the fact that the three-frequency phase-matching conditions are satisfied for different pump, idler, and signal frequencies for different directions through the crystal. Directions may be chosen, for example, by varying the angle of incidence of the pump or by varying the axis of a resonant cavity including the crystal. Such resonant cavity may result from the use of separate flat parallel or curved mirrors, or by mirrored surfaces on the crystal itself, utilizing any of the techniques familiar to the laser art. In embodiments of this invention, such variable frequency devices result upon rotation of the crystal so as to vary the angle defined by the pump beam and the optic axis or by variation of temperature so as to change the indices in the manner discussed in conjunction with FIGS. 2 and 3. Again, the general use of temperature variation, in this instance to change the phase-match conditions so as to vary the signal and idler frequencies for a given pump, is considered generally novel as applied to any phase-matchable nonlinear material. Of course, such temperature variation is to be preferred over crystal rotation in that it may permit a constant $\theta_m$ value of 90 degrees, so eliminating the restricting effect of double refraction.

Figure 4:
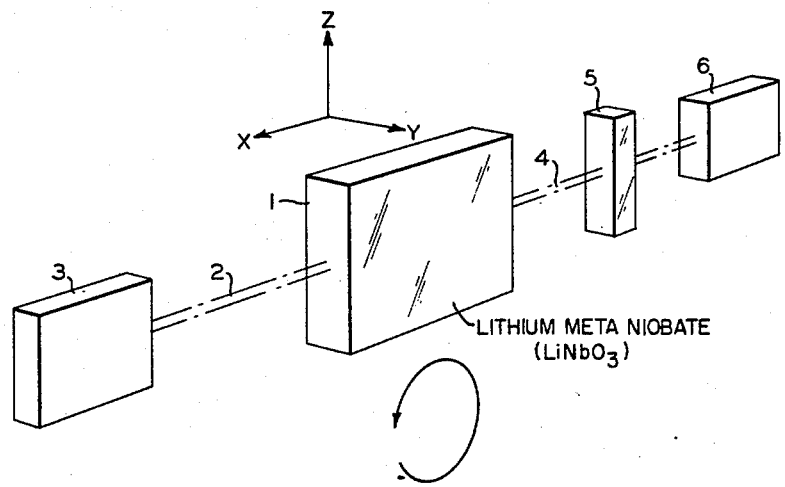
FIG. 4 is a perspective view of a nonlinear device utilizing a body of LiNbO₃.
Figure 5:
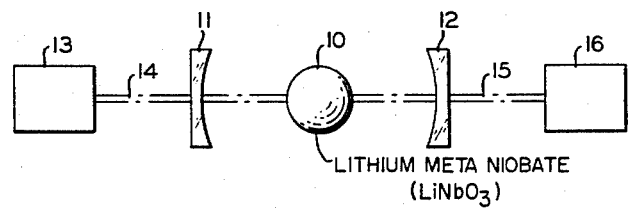
FIG. 5 is a front elevational view of another such device.
Figure 6:
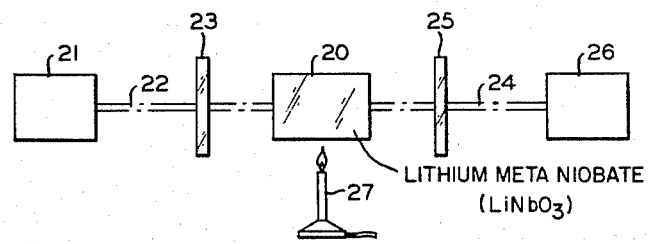
FIG. 6 is a front elevational view of yet another device utilizing a body of the material of this invention.

FIGS. 4, 5, and 6 depict devices utilizing the principles outlined above. In FIG. 4 there is depicted a single crystal body 1 of $LiNbO_3$. The crystallographic orientation of the body is indicated on the figure. A coherent electromagnetic beam 2 produced by source 3 is introduced into body 1, as shown. The resultant emerging beam 4 is then caused to pass through filter 5, and, upon departing, is detected by apparatus 6. For the SHG case, beam 2 is of a fundamental frequency while departing beam 4 additionally contains a wave of a frequency corresponding with the first harmonic of beam 2. Filter 5 is of such nature as to pass only the wave of concern, in the SHG instance that of the harmonic. Apparatus 6 senses only that portion of the beam leaving filter 5. The value of $\theta_m$ may be varied in body 1 by altering the angle between beam 2 and the Z axis, as by rotating the crystal about the Y axis. As has been indicated, the maximum birefringence is obtained for an angle of 90 degrees.

The device of FIG. 4 may similarly be regarded as a three-frequency device, with beam 2 containing frequencies to be mixed or consisting of a pump frequency. Under these conditions, exiting beam 4 contains signal and idler frequencies as well as pump, representing three distinct values for nondegenerate operation. For any operation, whether two frequency or three, efficiency is increased by resonance. Such may be accomplished by coating the surfaces of crystal 1, through which the beam enters and exits. This coating may be partially reflecting only for a generated frequency, as for example for the harmonic in SHG. For the three-frequency case, it is desirable to support both generated frequencies. In most instances, this cannot be accomplished by coating the face of the crystal, and it is necessary to provide at least one spaced adjustable mirror which may be positioned at such distance from the face of crystal 1 as to support the frequencies of concern. Simultaneous support of the pump frequency may similarly be accomplished. However, the complication so introduced is justified only when the pump level requires it.

The crystalline orientation shown as the initial position for crystal 1 in the apparatus of FIG. 4 eliminates the effect of double refraction, as has been discussed. This angle may be retained for a broad range of conditions when operating either in the degenerate or nondegenerate mode simply by controlling the temperature in the manner which has been discussed.

The device of FIG. 5 is described in detail in Patent No. 3,201,709, issued August 17, 1965, and utilizes a spherical body 10 of $LiNbO_3$. As described in that application, the use of a sphere eliminates certain difficulties which may result when non-normal incident surfaces are presented to the beam in a device such as that presented in FIG. 4 upon rotation of the crystal to decrease the birefringence and so meet the phase-matching condition for the desired frequencies. As described in the said patent, the use of a sphere expedites adjustment of the angle between the optic axis and the direction of wave propagation. Such variations in angle are effected in order to satisfy the phase-matching conditions whenever the resonator is tuned to a different frequency. It is known that confocal and nonconfocal curved mirror resonators have regions of stability and instability. That is, the resonator exhibits low losses only for certain prescribed ratios of mirror spacing to mirror curvature. For a thorough discussion of confocal resonators, see the article by G. D. Boyd and H. Kogelnik, entitled "Generalized Confocal Resonator Theory," published in the July 1962 issue of the Bell System Technical Journal, pages 1347 to 1370. The device of FIG. 5 is, however, broadly illustrative of a class utilizing external mirrors 11 and 12, expediently curved as shown and of such spacing as to support the frequency or frequencies desired. The device is completed by coherent source 13 producing beam 14, which passes through mirror 11 and is incident upon crystalline body 10, as shown. Exiting beam 15 contains whatever additional components result due to the action of sphere 10 and which are permitted to pass through mirror 12. Utilization of such beam is made in apparatus 16 which may, for example, be a photomultiplier.

FIG. 6 depicts a nonlinear device comprising nonlinear, phase-matchable crystalline body 20. The device shown is capable of any of the functions discussed and makes use of coherent source 21 furnishing beam 22 which passes through mirror 23 into crystalline body 20. The nonlinear mechanism results in output beam 24 containing whatever additional components are produced by body 20. Supported frequency/frequencies are resonated by mirrors 23 and 25, at least one of which is permitted to pass through partially reflecting mirror 25 into utilization apparatus 26. A heating means 27 may be utilized simply to adjust the matching angle $\theta_m$ to 90 degrees, or may be utilized to adjust the phase-matching conditions so as to produce a desired signal frequency $\omega_1$ in a tunable parametric mode.

The operation of most of the described devices is thoroughly understood by those skilled in the art. The added efficiency which results upon incorporation of lithium metaniobate as a functional material has been indicated. A specific case further illustrates this advantage. An input beam at 1.15 microns and having a power of $10^{-3}$ watt is assumed. From the data plotted on FIG. 1, taken together with the description, it may be determined that $\sin^2 \theta_m = 0.825$, or that $\theta_m = 65.26$ degrees. For a crystal length of 1 centimeter in the direction determined by this angle and for a beam radius of 0.1 centimeter, there is obtained an output beam having a wavelength of 0.575 micron and a power level of $1.2 \times 10^{-9}$ watt.

The invention is largely directed to the use of $LiNbO_3$ and, in fact, is so restricted except where otherwise noted. This material is of particular utility as discussed by reason of its relatively large nonlinear coefficient compared to KDP, coupled with birefringence and dispersion values such that phase-matching may be accomplished. Generally, the advantageous use of this material obtains for a large range of intended or unintended additional ingredients. For optimum use, however, it is evident that the crystalline material should be as nearly optically perfect as possible. Suitable crystals, generally free of domain walls and other imperfections, may be produced by crystal pulling.

Certain other fundamental considerations are not essential to this disclosure and have therefore not been treated. These include the suitable beam directions through the crystal, all of which are apparent to a person skilled in the art on the basis of the symmetry reported. For example, it has been indicated that the angle defined by the beam direction and the $c$ axis determines the phase-match conditions. While this is true from that standpoint, it is known that the magnitude of the nonlinear function changes about the cone generated by the beam directions meeting the phase-match conditions. From symmetry conditions it is apparent that the coefficient $d_{31}$ and $d_{22}$ are those of concern. The exception to this statement obtains for those embodiments in which the beam direction is normal to the $c$ axis, in which event all directions meeting the phase-match conditions are equivalent from the standpoint of nonlinearity. For a $\theta_m \neq 90°$ maximum efficiency results when the E vector is in the YZ plane for it is for this description that both coefficients $d_{31}$ and $d_{22}$ are utilized.

In similar fashion, there has been little detailed discussion on the subject of the energizing radiation. It is, of course, required that such emanation be coherent. For comunication purposes, the pump should probably also be continuous. Suitable sources are, of course, the various gas and solid-state lasers that have achieved this condition. Other uses may not require a CW pump and, in such event, in view of the fact that for either second harmonic or other output radiation, output level varies as the square of the intensity, it may be desirable to take advantage of the higher peak powers that may be realized by use of a pulse laser source.

Certain considerations common to the general class of devices treated herein have not been discussed. For example, it is well known that the efficient use of any of the phenomena described is in turn dependent on beam intensity and, thus, focusing of the beam is desirable. In fact, power output, it is recognized, for the phase-matched condition and ignoring double refraction effects, is dependent upon $l^2/\omega^2$, where $l$ is the crystal dimension in the direction of propagation of the beam and $\omega$ is the beam diameter. No attempt has been made to describe in detail the vast array of devices in which the material herein is advantageously incorporated. Some such devices are described in the various copending applications and references noted herein. Others are known to those skilled in the art. All such devices now known or which may emerge in the future which may share the advantages described for $LiNbO_3$ are considered within the scope of this invention.

What is claimed is:

1. Device comprising a crystalline body consisting essentially of $LiNbO_3$, together with means for introducing a beam of coherent plane polarized electromagnetic radiation of a first frequency into the said body and means for extracting from the said body a beam of coherent electromagnetic radiation of a second frequency, the said body being positioned so that the angle defined by the said incoming beam and the optic axis is such that an ordinary wave of one of the said frequencies within the said body is phase-matched to an extraordinary wave of another of the said frequencies within the body.

2. Device of claim 1, together with resonant means for supporting a standing wave of at least one of the said frequencies in the said body.

3. Device of claim 2 in which the said resonant means consists of reflecting surfaces integral with the said body.

4. Device of claim 2 in which the said resonant means consists of reflecting surfaces at least one of which is spaced from the said body.

5. Device of claim 2 in which the said resonant means includes at least one curved reflecting surface, the said surface being concave as viewed from the said body.

6. Device of claim 1 in which the angle defined by the incoming beam and the optic axis of the said body is 90°.

7. Device of claim 6, together with thermal means for maintaining the said body at a temperature such that phase-matching occurs when the angle defined by the incoming beam and the optic axis of the said body is 90°.

8. Device of claim 1 in which the said second frequency is a harmonic of the said first frequency, and in which the angle defined by the incoming beam and the optic axis of the said body is given by the expression:

$$\sin^2 \theta_m = \left(\frac{n_2^e}{n_1^o}\right)^2 \frac{[(n_2^o)^2 - (n_1^o)^2]}{[(n_2^o)^2 - (n_2^e)^2]} \simeq \frac{D}{B}$$

where $n$ is the index of refraction, subscripts 1 and 2 relate to fundamental and harmonic, respectively, or for the general degenerate case, the lower and higher frequencies, respectively, superscripts $o$ and $e$ refer to ordinary and extraordinary, respectively, D is a dispersive term defined as $n_2^o$ minus $n_1^o$, and B is the birefringence, here defined as $n_2^o$ minus $n_2^e$.

9. Device of claim 1 in which there are coherent electromagnetic waves of three frequencies within the said body, the frequency relationship being such that the greatest is equal to the sum of the other two.

10. Device of claim 9 in which the incoming beam consists essentially of electromagnetic radiation of the greatest frequency, the position of the said body relative to the incoming beam being such that the following relationship is satisfied:

$$\omega_3 n_3 = \omega_1 n_1 + \omega_2 n_2$$

in which $\omega$ is the frequency of the coherent radiation of cincern, $n$ is the index of refraction for a wave of the said radiation, and the subscripts 3, 1, and 2 refer to the greatest and other frequencies, respectively.

11. Device of claim 10, together with means for varying the effective relative birefringence and dispersion values within the said body for the incoming beam.

12. Device of claim 11 in which the said means includes the rotation of the said body in such direction as to vary the angle defined by the incoming beam and the optic axis of the said body.

13. Device of claim 1 in which the said body is spherical.

14. Device comprising a piezoelectric crystal characterized by values of birefringence and dispersion such that ordinary and extraordinary rays of different frequency coherent electromagnetic radiation may be phase-matched within the said crystal, together with means for introducing into the said crystal a plane polarized first beam of coherent electromagnetic radiation, and means for extracting from the said crystal a second beam of coherent electromagnetic radiation, the said second beam containing a component having a frequency different from any contained within the said first beam, and together with thermal means for effecting phase-matching of different frequency coherent electromagnetic radiation by changing the relative values of birefringence and dispersion within the said crystal.

15. Device of claim 14 in which the said thermal means is adapted to maintain a temperature such that the said phase-matching occurs for an input beam direction normal to that of an optic axis in the said crystal.

16. Device of claim 14 in which introduction of the said first beam results in generation within the crystal of two frequencies the sum of which equals the frequency of the said first beam, and in which the said thermal means is adapted to change the relative values of birefringence and dispersion in such manner that the relationship $$\omega_3 n_3 = \omega_1 n_1 + \omega_2 n_2$$

in which $\omega$ is the frequency of the coherent radiation of concern, $n$ is the index of refraction for a wave of the said radiation, and the subscripts 3, 1, and 2 refer to the greatest and other frequencies, respectively, is satisfied for a desired frequency $\omega_1$.

17. Device of claim 16 in which the said thermal means is continuously variable such as to be adapted for a continuous variation in output frequency.

18. Device of claim 17 in which the said crystal consists of $LiNbO_3$.

No references cited.

ROY LAKE, *Primary Examiner.*

D. M. HOSTETTER, *Assistant Examiner.*